Nov. 8, 1966

G. D. GOODWIN 3,283,901

ENDLESS BELT TYPE SOLIDS SEPARATOR

Filed March 21, 1963

United States Patent Office 3,283,901
Patented Nov. 8, 1966

3,283,901
ENDLESS BELT TYPE SOLIDS SEPARATOR
George Dee Goodwin, Rte. 1, Florence, Colo.
Filed Mar. 21, 1963, Ser. No. 266,967
3 Claims. (Cl. 209—428)

This invention relates to a rotary type apparatus for separating granular materials which have different specific gravities.

In known separating devices for the separation of coarse from fine, or heavy from light particles, slurries of the materials are usually introduced into the apparatus and the classifying or separating action is based on the differential rates of settling of the particles. Such devices in the past have required a very carefully regulated flow-path through the device, and an equally carefully regulated continuous supply of the slurry. In most such devices problems arise in removing the various grades of materials from the settling pool without agitating the pool and thus disturbing the essential settling action.

It is an object of this invention to provide a material separating device in which the coarser, lighter weight materials are separated from the finer, heavier materials by means of mechanically induced centrifugal and flotation forces.

It is a further object of this invention to provide a material separating device in which the separating forces are controlled simply by adjusting the speed of a variable speed motor.

It is a further object of this invention to provide a material separating device which does not require pre-mixed slurries of materials or a continuous supply of a carrier medium.

The device of the present invention was developed primarily for use in separating free or flour gold from the sands and debris with which it is mixed as it is derived from placer mining operations. However, it is apparent that the principles may be applied and the mechanism used, wherever it is desired to efficiently and rapidly separate heavy from light particles.

The invention will be more particularly described for the purpose of illustration with reference to the accompanying drawing in which.

Figure 1:
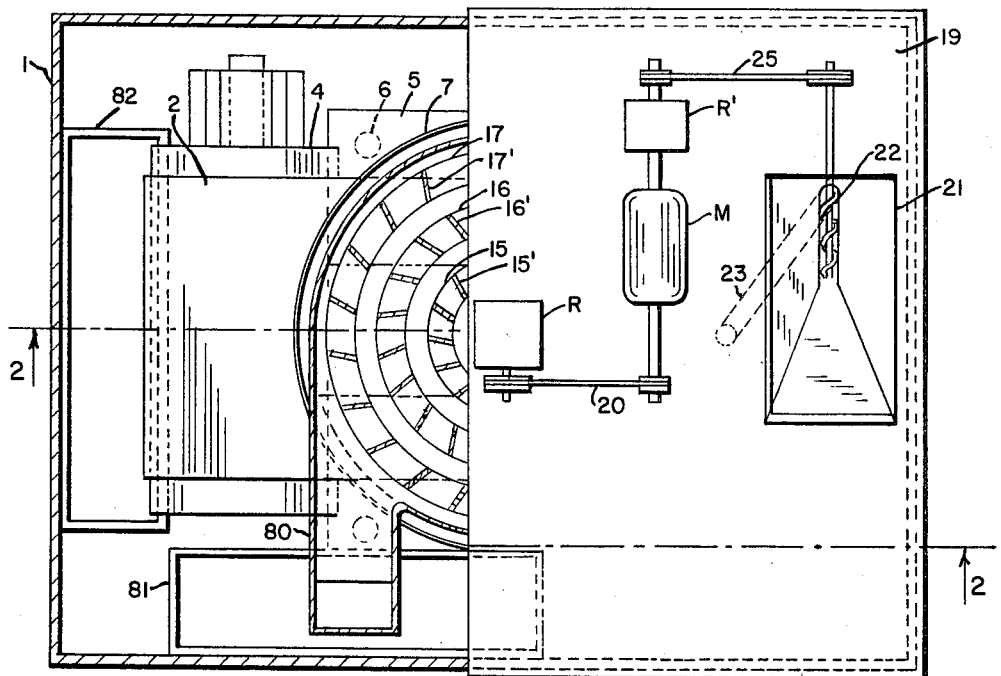
FIG. 1 is a plan view, with a part thereof in section, taken on the line 1—1 of FIG. 2.

In the drawings, 1 represents a fluid tight tank in which the separation elements of the device are positioned. The conveyor belt 2 is mounted on pulleys 3, 4 for movement in the direction of the arrow shown in FIG. 2. The upper reach of the conveyor belt 2 moves across a platen 5, supported by supports 6 diagrammatically indicated in FIGS. 1 and 2.

Figure 3:
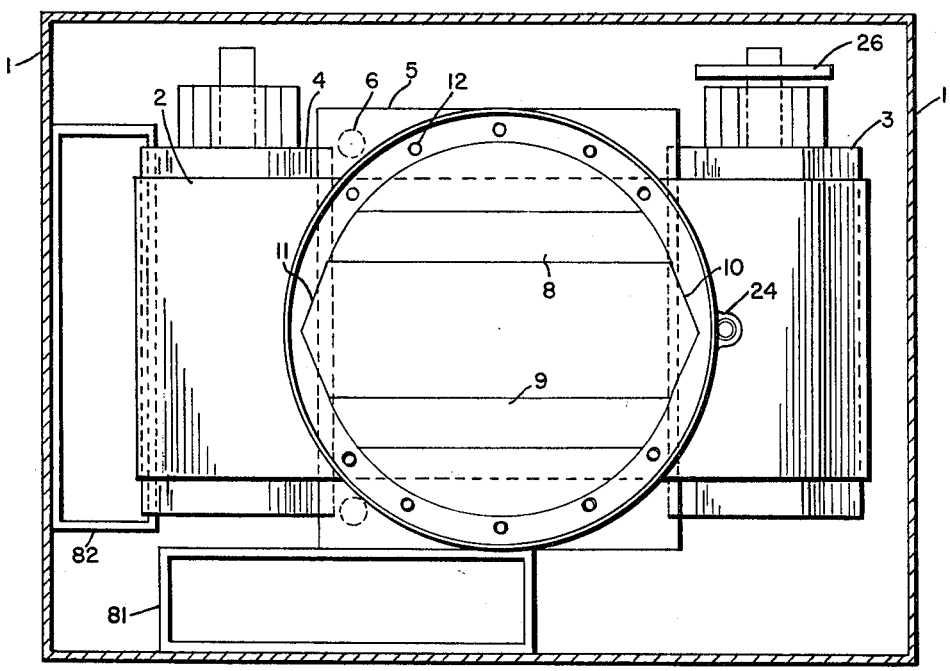
FIG. 3 is a horizontal sectional view taken on the line 3—3 of FIG. 2.
Figure 4:
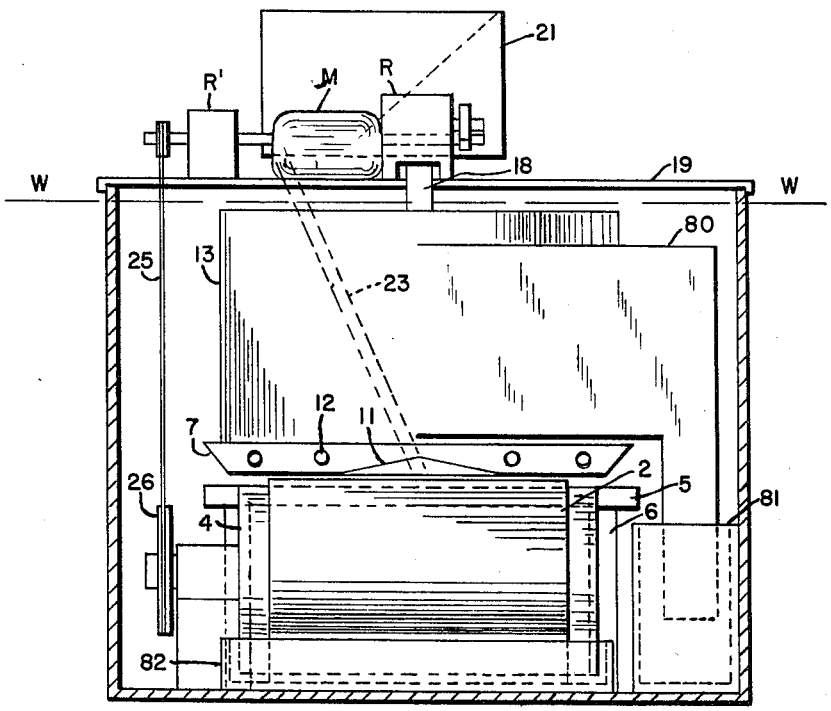
FIG. 4 is an end elevation of the device with the tank broken away to more clearly illustrate the debris duct.

The platen 5 serves to hold the conveyor belt 2 in a flat condition and also as a support for the gateway pan 7 which is positioned over the belt. The gateway pan 7 has side leaves 8 and 9 as shown in FIG. 3, which overlap and engage the edges of the conveyor belt 2. The edges of the pan 7 are cut away as at 10 and 11 to form gateways for the admission of the mixed materials and the exit of the heavy component of the mixture respectively, in a manner to be more fully explained later in this specification. The pan 7 is further provided with perforations as at 12 to admit fluid of the bath to the separation zone. The separation zone comprises the space immediately above the conveyor belt 2 and enclosed by the gateway pan 7 and the lower annular wall 14 of the cylindrical housing 13 which is of a size to seat on the upper portion of the gateway pan 7. The lower end of the housing 13 is partially closed by the annular wall 14. The housing 13 has a rectangular duct 80 leading from the sidewall thereof, as more clearly shown in FIGS. 1 and 4, for a purpose to be subsequently described.

The squirrel cage flow inducers 15 and 17 are positioned in concentric relationship in the housing 13. Each of the flow inducers 15 and 17 is provided with a disc-like substantially closed top by which it is secured to the shaft 18 for rotation therewith. The third squirrel cage element 16, which acts as a flow stabilizer, is fixedly mounted on the bottom annular wall 14 of housing 13 and is concentrically arranged between the flow inducers 15 and 17. The element 16 also has a disc-like substantially closed top, the aperture therethrough being of a size to permit free rotation of the shaft 18 therein.

Figure 2:
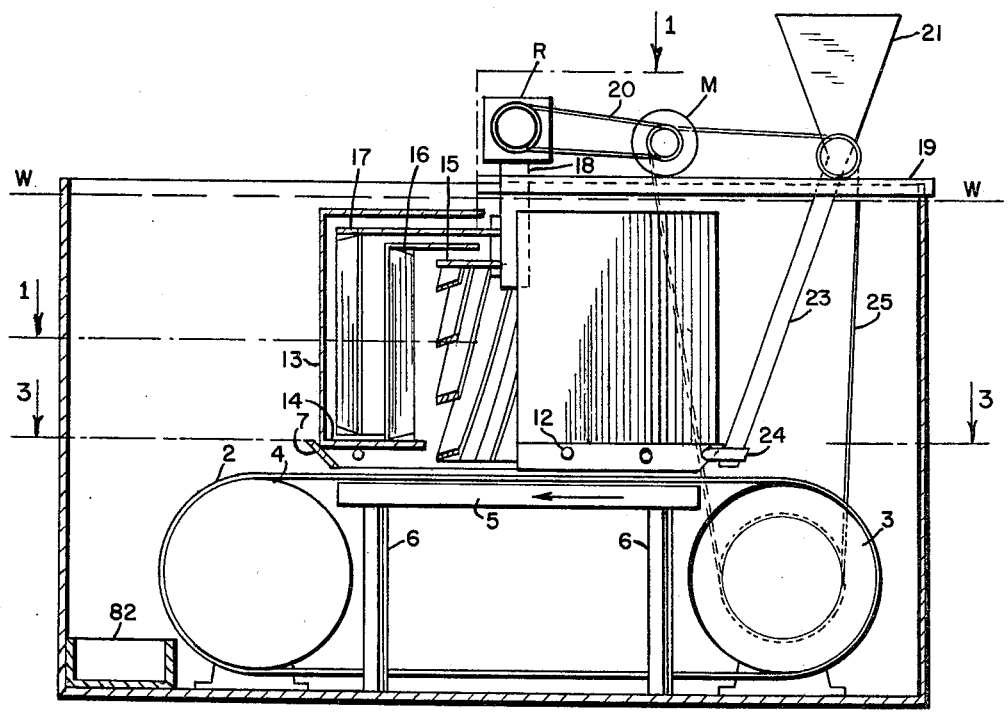
FIG. 2 is a vertical sectional view of the device taken on the line 2—2 of FIG. 1.

The flow inducer 15 has blades 15' inclined with reference to its axis and formed with an outward pitch. As illustrated in FIG. 2, the lower end of the flow inducer 15 extends through the aperture in the annular wall 14 into the separation zone. The stationary stabilizer element 16 which is fixedly secured to wall 14, has blades 16' which are parallel with its axis and formed with an inward pitch. The flow inducer 17 has blades 17' which are parallel with its axis and formed with an outward pitch.

A cover 19, extending partially over the top of the tank 1 forms the support for a supply hopper 21 and the driving elements for the mechanism. As illustrated particularly in FIG. 1 the hopper 21 is provided with a helical-screw type feed device 22 which leads to a conveyor tube 23 which is supported by a pipe strap 24 adjacent the gateway 10 in gateway pan 7 and the conveyor belt 2.

The shaft 18, to which the flow inducers 15 and 17 are secured, is rotatably mounted on the cover 19 to be driven by means of a conventional speed reducing gear R and a variable speed motor M. For purposes of illustration a belt drive 20 is shown between the motor M and the reducing gear R. Similarly, a belt drive 25 is shown from a second conventional speed reducing gear R' to the helical feed screw 22 of hopper 21 and a pulley 26 fixed to the shaft of pulley 3 which drives the main conveyor belt 2. It will be understood that other and different conventional driving elements may be used to drive and control the relative speed of the various parts of the mechanism without departing from the scope of the invention.

Operation

To prepare the device for operation the tank 1 is filled to the level W—W with a suitable liquid. The materials to be separated are placed in the hopper 21 and the trays of containers 81 and 82 are placed, respectively, under the open end of the discharge duct 80 and under the end of the conveyor belt 2. When the motor M is started the helical feed screw 22, conveyor belt 2, and the flow inducers 15 and 17 move at their adjusted relative speeds. The helical feed screw 22 gradually feeds the mixed materials from the hopper 21 to the conveyor tube 23 which deposits them on the moving conveyor belt 2. The conveyor belt 2 moves the mixed materials through the gateway 10 into the separation zone. The rotation of the squirrel cage flow inducer 15 with its inclined and outwardly pitched blades 15' causes an upward and outward flow of the liquid bath. As the liquid of the bath is caused to rise, flow is induced through the perforations 12 and gateways 10 and 11 in the gateway pan 7 which assists the separating action by agitating and washing the mixture on the conveyor belt 2. During this action the coarser, lighter particles of the mixture are entrained in the liquid of the bath and elevated therewith from the separation zone into the cylindrical housing 13. The flow of liquid and entrained particles from the flow inducer 15 continues through the stationary stabilizer 16 with its straight inwardly pitched blades 16'. The stabilizer 16 functions to provide a more orderly outward flow of material and, in effect, minimizes swirling of the liquid in the separation zone and in the container 13. The flow of liquid and entrained particles continues from the stabilizer 16 through the outermost rotating flow inducer 17 which, with its straight outwardly pitched blades 17', causes the liquid and entrained particles to be moved by centrifugal forces through the duct 80 from which the entrained particles of sand and debris are deposited in the tray or container 81. The heavy component of the original mixed materials remains on the conveyor belt 2 and is carried from the separation zone through the gateway 11 and finally deposited in the container 82 at the end of the conveyor belt 2.

When the device is used to separate free or flour gold from the sand and debris with which it is associated, water is a very convenient and suitable liquid for the bath in which the mechanism of the invention is submerged. However, if other materials are to be separated one component of which may be soluble in water for example, then some other liquid would have to be used for the bath, an oil for instance. Similarly, if dry materials are to be separated such as grains or grass seed from their chaffs, then the liquid bath would be omitted and the separating action would merely occur in the atmosphere.

I claim:

1. A rotary type solids separator comprising an endless conveyor belt, a gateway pan supported above the conveyor belt, a cylindrical housing supported on said gateway pan, spaced concentric cylindrical flow inducers rotatably mounted in said cylindrical housing, the innermost of said flow inducers having inclined blades formed with an outward pitch and the outermost of said flow inducers having vertical blades formed with an outward pitch, a cylindrical flow stabilizer having vertical blades formed with an inward pitch, said stabilizer concentrically and fixedly mounted in said cylindrical housing between said flow inducers, feed means to supply mixed materials to said conveyor belt, and motor means to drive said feed means, said conveyor belt, and said rotatable flow inducers.

2. A rotary type solids separator comprising a liquid-tight tank, an endless conveyor belt mounted in said tank, a platen supporting the upper reach of the conveyor belt in a flat condition, a gateway pan supported from the platen above said conveyor belt, the lower edge of said gateway pan being cut away at diametrically opposite points to form gateways adjacent the conveyor belt, leaves projecting inwardly from the sides of said pan and having their edges contacting the conveyor belt to limit the area of the conveyor belt exposed within the pan, a cylindrical housing seated on the upper portion of the gateway pan, an annular wall partiallly closing the lower end of said cylindrical housing, said conveyor belt, gateway pan and annular wall defining a separation zone, a shaft projecting into the upper end of said cylindrical housing, concentric squirrel cage flow inducers secured to said shaft, within said housing, the innermost flow inducer projecting through the opening in said annular wall and having inclined blades formed with an outward pitch to cause an upward and outward flow upon rotation of said flow inducers, the outermost flow inducer having vertical blades formed with an outward pitch to cause further outward flow upon rotation of said flow inducers, feed means to supply mixed materials to said conveyor belt at a point in advance of one gateway in the gateway pan, and variable speed motor means to drive said feed means, said conveyor belt, and said flow inducers whereby mixed materials supplied to said conveyor belt are conveyed into said separation zone in which the lighter components of the mixed materials are entrained by flotation and centrifugal forces and the heavier components of the mixed materials remain on said conveyor belt to be conveyed out of said separation zone and deposited in a receiver at the end of said conveyor belt.

3. A liquid bath centrifugal type separator for granular materials which have components of varying specific gravities, comprising an open topped tank, a cover extending partially over the top of said tank, a rotatable shaft mounted on and extending vertically through said cover, a contrifugal type flow device, including a cylindrical housing having an inlet and an outlet duct and a rotary flow inducer, said flow inducer including cylindrical, concentric, bladed elements having the blades thereof shaped and pitched in a manner to cause upward and outward flow of materials therethrough, said flow device mounted within said tank and having its rotary flow inducer connected to said vertical shaft, a conveyor belt mounted in said tank adjacent the inlet of said cylindrical housing, a mechanical feed supply hopper mounted on said cover, a conveyor tube extending from said supply hopper to a point on said conveyor belt in advance of the inlet to said centrifugal flow device, a variable speed driving mechanism mounted on said cover and connected to drive said mechanical feed of the supply hopper, said conveyor belt within the tank, and the vertical shaft connected to the rotary flow inducer whereby granular materials fed from said supply hopper to said conveyor belt are carried thereby past the inlet to the centrifugal flow device where the lighter components are entrained and discharged through the outlet duct to a receiver and the heavier components are carried to a receiver at the end of the conveyor belt.

References Cited by the Examiner
UNITED STATES PATENTS

| | | | |
|---|---|---|---|
| 287,546 | 10/1883 | Johnson | 209—159 X |
| 1,736,008 | 11/1929 | Lide | 209—430 X |
| 2,823,801 | 2/1958 | Strohl | 209—159 |
| 2,913,108 | 11/1959 | Williams | 209—138 |

FRANK W. LUTTER, *Primary Examiner.*